June 21, 1966  F. FURRER  3,256,923
DEVICE FOR LOOSENING A VEHICLE TYRE FROM ITS RIM
Filed April 20, 1964  2 Sheets-Sheet 1

INVENTOR
FERDINAND FURRER
BY Lane, Aitken, Dunner & Ziems
ATTORNEYS

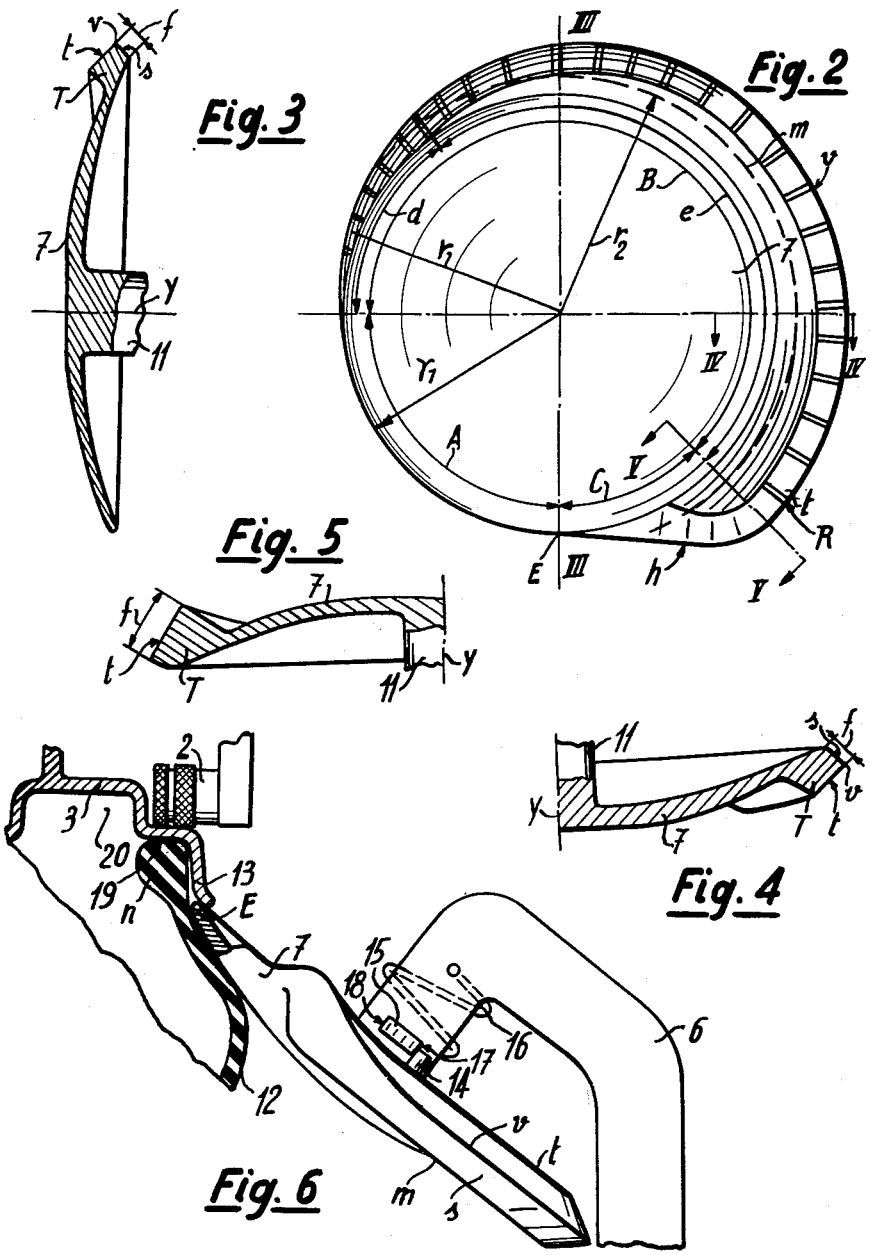

United States Patent Office 3,256,923
Patented June 21, 1966

3,256,923
DEVICE FOR LOOSENING A VEHICLE TYRE FROM ITS RIM
Ferdinand Furrer, Zurich, Switzerland, assignor to Julio Villars, Geneva, Switzerland
Filed Apr. 20, 1964, Ser. No. 361,058
Claims priority, application Switzerland, Apr. 24, 1963, 5,181/63; Apr. 9, 1964, 4,483/64
5 Claims. (Cl. 157—1.17)

When removing the tyre of a road vehicle for example, it is first of all necessary to loosen the tyre from the rim on which it is mounted so as to permit inserting of a removing tool between the wall of the tyre and the rim.

There at present exist a large number of devices specially conceived for this tyre loosening operation. Certain of these devices, manually operated, necessitate a great effort on the part of the operator and risk damage to the tyre by means of the end of said tool bearing on the outside of the tyre. Other devices pneumatically operated exert a thrust on the wall of the tyre reproducing as it were the thrust exerted by an operator with his feet. These various pneumatic devices have the disadvantage of exerting a thrust on the flexible portion of the wall of the tyre, so that in certain cases this wall is deformed under the action of this thrust with the result that the loosening cannot be effected.

The present invention has for an object the provision of a device for loosening a vehicle tyre from its rim which comprises a support for the rim and a loosening tool. This device differs from known devices in that it comprises on the one hand a rim gripping device including jaws bearing on the inner face of the rim and on the other hand a support carrying at least one loosening tool having the general shape of a cam rotating freely on an axle and the peripheral edge of which has on at least one portion of its length progressive radii and on at least a portion of the progressive radii profile a thickness increasing according to a function of the radius, and further in that adjusting means are provided to adjust the position of the tool relative to the rim gripped by the gripping device and to engage the peripheral part of smaller thickness of said loosening tool between the tyre and the rim, and finally in that the tool support and the gripping device are movable one with respect to the other through a rotary movement having for centre the centre of the rim, the whole arranged so that upon relative movement between the tool support and the rim, the tool moving along the rim is driven to rotate by friction on its axle and thus penetrates progressively more deeply between the tyre and the rim while at the same time separating the tyre from the rim.

The accompanying drawing shows diagrammatically and by way of example an embodiment of the device object of the invention as well as one special embodiment of the loosening tool.

FIG. 2 is a plan view of a particular embodiment of the loosening tool.

FIGS. 3 to 5 are partial sections of the tool along lines III—III, IV—IV and V—V respectively of FIG. 2.

FIG. 6 is a partial view of the device object of the invention showing the position of the loosening tool relative to a vehicle wheel at the beginning of the loosening cycle.

Figure 1:
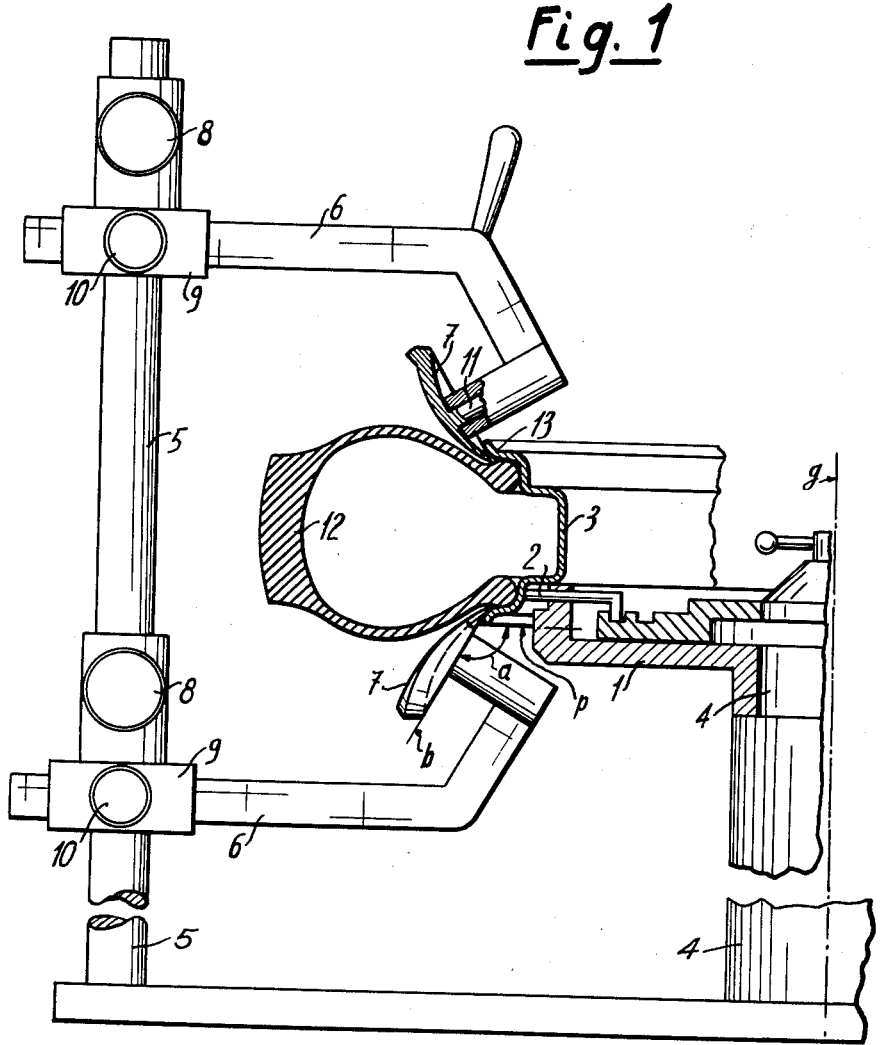
FIG. 1 is a side view of an embodiment of the device for loosening a vehicle tyre from its rim.

According to FIG. 1 of the attached drawings, the device comprises a table 1 provided with a gripping device constituted by three jaws 2, only one of which is shown. These jaws 2 are adapted to grip the rim 3 by its inner face. The jaws may be actuated individually, but preferably simultaneously by any classical mechanical or pneumatic devices, bringing about a simultaneous and symmetrical separation of the three jaws so that the rim gripped by the jaws is centred relative to a shaft 4 of the table 1. Thus this shaft is located in the geometrical axis of the rim. (It is to be noted that the jaws 2 are illustrated schematically in FIGURE 1 whereas, in FIGURE 6, they have been illustrated in greater scale and in a more detailed manner for purposes of clarity, albeit in only partial form.)

The device further comprises a support 5 constituted by a column rigidly fixed relative to the pivot 4 of the table 1. This column carries two arms 6 each provided with a cam 7 at their end. Each arm 6 extends radially relative to the rim 3 and is adjustable in height along the column 5. Screws 8 permit fixing of the position of each arm 6 relative to the column 5. Moreover, the length of each arm is slidably adjustable inside a sleeve 9. The length of each arm 6 and thus the position of each cam 7 is fixed after adjustment by screws 10.

Each cam 7 which constitutes a loosening tool pivots on an axle 11 carried by the end of each arm 6 and has a circumference of progressive radii on at least a part of its length. Moreover, as shown in FIG. 1, the thickness of its edge is also progressive and increases according to a function of the progression of the radius of its circumference.

When the operator wishes to loosen a tyre 12 from its rim 3, he rests this rim on the table 1 and then, by actuating the jaws 2 he fixes this rim on the said table. The operator then adjusts in height and then radially the two cams 7 so that the part of their circumference nearest to the axle 11 and which also has the smallest thickness penetrates a few millimetres between the tyre 12 and the flange 13 of the rim 3. In order to facilitate this penetration, part *a* (see FIGURE 2) of the circumference of each cam 7 has in cross section the shape of a wedge (see FIGURE 3) and the plane *b* of each cam is inclined at an angle *a* relative to the plane *p* of the rim 3. Moreover, always with a view to facilitating the penetration of the cam profile between the rim and the tyre, said cam 7 is curved and has the general shape of a cup, the outer curved wall of which enters into contact with the tyre.

The device being thus adjusted, the operator actuates the table 1 and thus the rim 3 either by hand or preferably automatically so as to cause it to pivot about its geometrical axis *g*. This rotation of the rim 3 provided with its tyre 12, frictionally drives the cams 7 to rotate about their respective axles 11. In order to increase the friction coefficient, the surface of each cam located opposite the tyre may be striated. Since the profile of each cam 7, over at least a part of its circumference, has progressive radii, the edge of each cam penetrates, during rotation of the rim, more deeply between the flange of the rim and the tyre. Now, the thickness of the edge of each cam being also progressive relative to the radius of the profile over at least a part of its circumference, it is obvious that as the rim rotates, the tyre is still further separated from the rim which automatically brings about the simultaneous loosening of the two sides of the tyre.

According to a modification, the table could be stationary, while the column 5 could be mounted on a rotary base turning around the geometrical axis *g* of the rim 3. In fact, in order to realize the operation described of the device it is sufficient to impart between the rim and the loosening tools a relative angular movement having for centre the geometrical axis of the rim.

Many other modifications of construction may be foreseen without departing from the scope of the invention. Thus, for example, the profile of each cam may be progressive either over practically the whole length of its circumference as well as the thickness of its edge or over only a part of its circumference.

According to another modification, the device could only comprise a single loosening tool. In this case, the operator first loosens one of the sides of the tyre, and then, after turning the rim 3, loosens the opposite side of the tyre.

According to FIGS. 2 to 6, the loosening tool is constituted by a rotary cam 7 having the general shape of a portion of a hollow sphere of which the central part, centred on the rotational axis of the tool, has a gradually diminishing thickness from the rotational axis Y towards the periphery of the tool. In cross section, this central part of the cam has thus the general shape of a curved spine. This cam is provided with a pivot 11 concentric with its axis of rotation Y and adapted to secure and pivot this cam 7 on an arm 6 of the tyre loosening device.

The periphery of this loosening tool or cam having the general form of a snail shell has progressive radii from a point of contact E to a point R situated at about 300 to 320° from the point E. From this point E the peripheral edge comprises a first zone A which has in cross section a shape which tapers towards its periphery such as the curved spine shape shown in the lower part of FIG. 3. It is however to be noted that the peripheral edge of the cam is not cutting but rounded so as not to damage a tyre or inner tube when removing a tyre.

In the first zone A of the periphery of the cam 7, the so-called penetration part, said cam thus has an edge with constant radius $r_1$ and a small and constant thickness.

The angular extent of this first zone A of the periphery of the cam 7 having the general shape of a snail shell is approximately equal to 90°. The point of engagement E is placed in the rest position of the cam 7 (position shown in FIG. 6) opposite the rim of the tyre.

This first zone of the cam periphery is followed by a second so-called separating zone B. This second zone B has progressive radii $r$ and has thus the general shape of a snail shell. This second zone B of the cam 7 has an angular extent of approximately 230°. A portion $d$ of this separating zone B of the cam 7 has in cross section a shape similar to that of the first engagement zone A of the cam 7. This first portion extends angularly approximately over 30 to 60°. This first portion is followed by a second portion $e$ the thickness $f$ of which increases. In fact, the thickness $f$ in this second portion $e$ of the separating zone B of the cam 7 is a function of the radius $r$ of this portion. In the embodiment shown, this thickness $f$ increases proportionally to the increase of the radius $r$ of this separating zone.

This second zone B of the cam 7 thus has, directly adjacent to its periphery, a shoulder T the thickness $f$ of which varies from one point to the other of this portion of the periphery of the cam 7. The outer face $t$ of this shoulder T is adapted to enter into contact with the shoulder $n$ of the tyre 12, while the inner face $s$ of the cam 7 bears on the rim 3. To this end this face $s$ is inclined relative to the axis Y by an agle of about 60° and the inner edge of this face $s$ is situated on an arc of a circle of radius $r_2$.

Finally, this cam 7 has a third so-called connecting zone C connecting the second zone B to the first zone A of this cam having the general shape of a snail shell. This connecting zone C has a practically straight peripheral edge $h$ over nearly the whole of its length and is situated along a tangent to the cam 7 at a point of its periphery corresponding to the beginning of its first zone A. This straight portion of the connecting zone C is connected by a rounded portion to the second zone B of the cam. The thickness of the periphery of this third zone C of the cam 7 decreases rapidly which permits of joining the profiles of the end of the second zone B and the beginning of the first zone A.

This cam further comprises a device determining its angular engagement and loosening positions. This device is constituted in the embodiment shown by a stop 14 merging out of the concave inner face of the cam 7 and adapted to cooperate with an abutment 15 integral with arm 6 carrying this cam 7. The position and the dimensions of this abutment 15 are such that when the cam 7 is held by a return spring 16 in the angular position of rest or of engagement (FIG. 6), its stop 14 is in contact with the face 17 of the abutment 15 which determines the angular engagement position of the cam 7 and that when the end of the zone B of the cam 7, the shoulder T of which has the greatest thickness $f$, is situated between the rim 3 and the tyre 12, this stop 14 is in contact with the other face 18 of said abutment 15 which determines the maximum angular separating position.

The operation of this loosening tool is the following:

The operator first places a rim 3 with its tyre on the table 1 and secures the rim on this table by means of the jaws 2 as described with reference to FIG. 1. Then he places the engagement point E of the tool on the joint between the tyre and the rim as shown in FIG. 6. Then the operator causes the rim to rotate so that the cam is driven to rotate by friction. From that moment, the peripheral edge of the zone A with constant radius but of constant thickness penetrates automatically between the rim and the tyre. In order to increase the friction between the cam 7 and the tyre, the outer face $t$ of the edge of this cam is striated. When the cam, driven by friction, has rotated through about 90 to 110°, its peripheral edge with progressive radii penetrates deeply between the rim and the tyre and its peripheral edge is located directly adjacent to the base 19 of the rim. From this angular position of the cam the thickness of its edge increases progressively so that the rotation of this cam at once brings about the separation of the tyre from the flange 13 of the rim and simultaneously its border $v$ moves, due to the inclination of the face $s$, progressively towards the interior of the rim. Thus this inclination of the face $s$ prevents the peripheral edge of the cam from abutting against the base 19 of the rim.

Finally, when the stop 14 bears against the face 18 of the abutment 15, the section of greater thickness $f$ of the shoulder T of the cam 7 is engaged between the tyre 12 and the rim 3. The thickness $f$ of this section of the shoulder T of the cam is sufficient to separate the tyre sufficiently from the flange 13 of the rim to cause the shoulder $n$ of this tyre to penetrate into the recess 20 of the hollow rim 3. The operator continuing the actuation of the rim 3, the cam 7 causes the loosening of the tyre over the whole circumference of the rim. As soon as the tyre has been completely loosened the tool 7 being no longer squeezed between the rim and the tyre is actuated in the reverse direction by the spring 16 up to its angular position of rest or engagement determined by the stop 14 bearing against the face 17 of the abutment 15.

According to a modification, the abutment 15 could be constituted by two projections spaced angularly one from the other. This abutment 15 could also cooperate with two stops 14 spaced angularly one from the other.

A preferred embodiment of the cam 7 having the general shape of a snail shell has been described herein before, but it is obvious that its shape could be modified, in particular the angular extents of the parts A, B and C as well as the height or the thickness $f$ of the shoulder T, without departing from the scope of the present invention.

I claim:

1. A device for loosening the tyre of a road vehicle from a rim comprising rim gripping means having engaging means adapted for operably engaging the inner surface of the rim, support means, loosening tool means connected to said support means, said tool means comprising an axle, and a rotatable cam mounted on said axle, said cam having the shape of a portion of a hollow sphere including a peripheral edge, said peripheral edge being defined over a greater part of its length by progressively increasing radii, a point of said peripheral edge nearest the axis of said cam constituting an engagement point, said peripheral edge being divided into a plurality of tyre engaging zones, including (1) a penetration zone adjacent to said engagement point having a constant radius and constant thickness, (2) a separating zone adjacent to said penetration zone having progressively increasing radii over at least a part thereof and a thickness increasing in accordance with a function of the radius of the peripheral edge, and (3) a connecting zone adjacent to said separating zone for joining said separating zone to said engagement point, said connecting zone having a rapidly decreasing thickness, means for adjusting the position of said tool means in relation to said rim engaged by said gripping means and for engaging the engagement point of said peripheral edge between said tyre and said rim, said support means and said gripping means being movable relative to one another in a circular path the axis of which is the center axis of said rim, whereby upon relative movement between said support means and said rim said cam is frictionally rotated to penetrate progressively more deeply between said tyre and said rim thereby to cause a separation of said tyre from said rim.

2. A device as defined in claim 1 wherein said penetration zone of said cam has a cross-sectional area in the shape of a wedge decreasing in thickness toward the peripheral edge with the peripheral edge being rounded.

3. A device as defined in claim 2 wherein the peripheral edge of said separation zone has a face inclined at an angle of approximately 60° relative to the axis of rotation of said cam, said inclined face having an inner edge constituted by an arc of a circle centered on the center axis of said rim.

4. A device as defined in claim 3 wherein the greatest thickness of said peripheral edge of said cam is sufficient to cause the shoulder of said tyre to move out of contact with said rim.

5. A device as defined in claim 1 further comprising spring means for returning said cam to its engagement point, and stop means for positioning said cam at the engagement point and the position wherein the greatest thickness of said cam is between said tyre and rim causing the maximum separation of said tyre and rim.

References Cited by the Examiner

UNITED STATES PATENTS

| 1,250,180 | 12/1917 | Hughes | 157—1.17X |
| 1,416,094 | 5/1922 | Krauska | 157—1.22 |
| 2,270,758 | 1/1942 | Meinzinger | 157—.17 |
| 2,270,759 | 1/1942 | Meinzinger | 157—1.17 |
| 2,837,147 | 6/1958 | Henderson et al. | 157—1.28 |
| 2,925,857 | 2/1960 | Twiford | 157—1 |
| 3,086,578 | 4/1963 | Breazeale et al. | 157—1.24 |

GRANVILLE Y. CUSTER, Jr., *Primary Examiner.*